C. H. PELTON.
AGRICULTURAL IMPLEMENT.
APPLICATION FILED APR. 17, 1920.

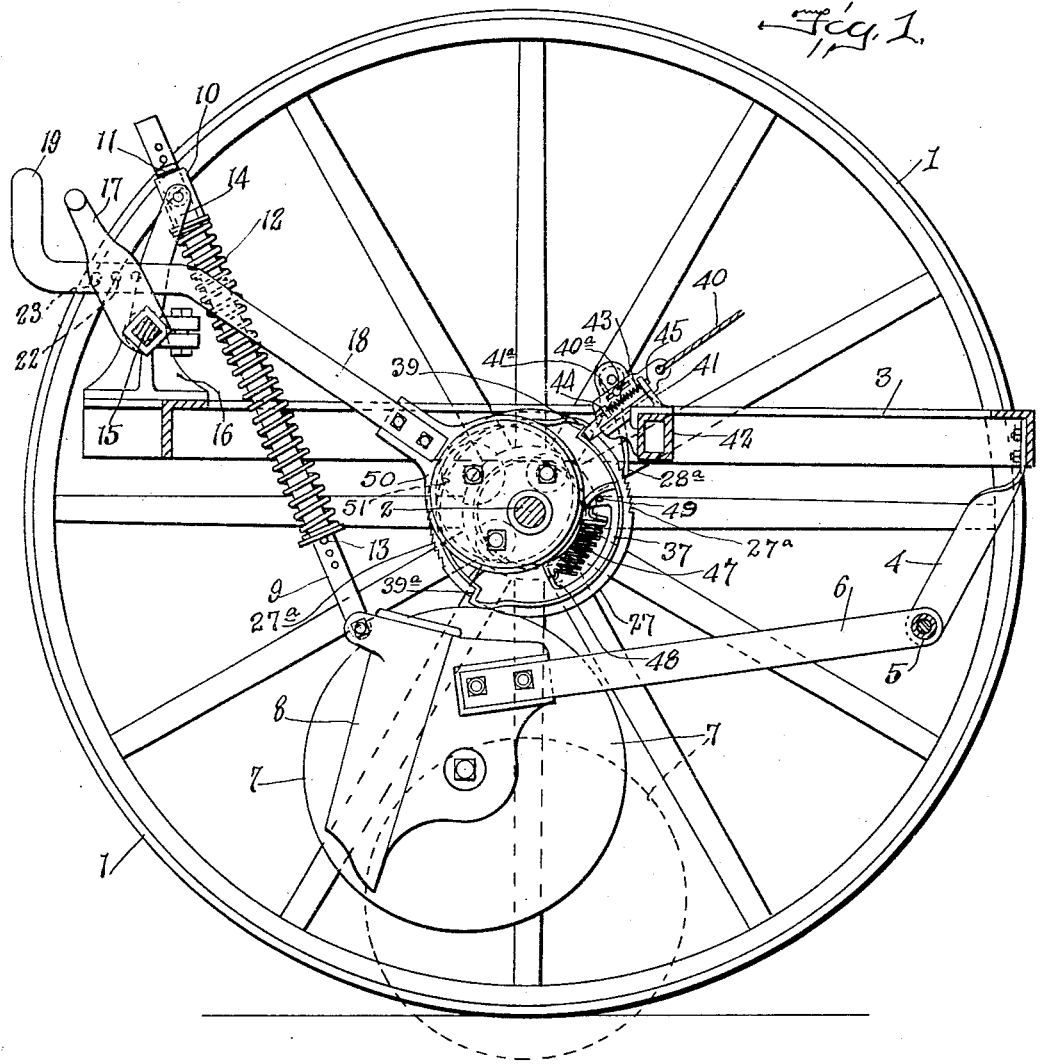

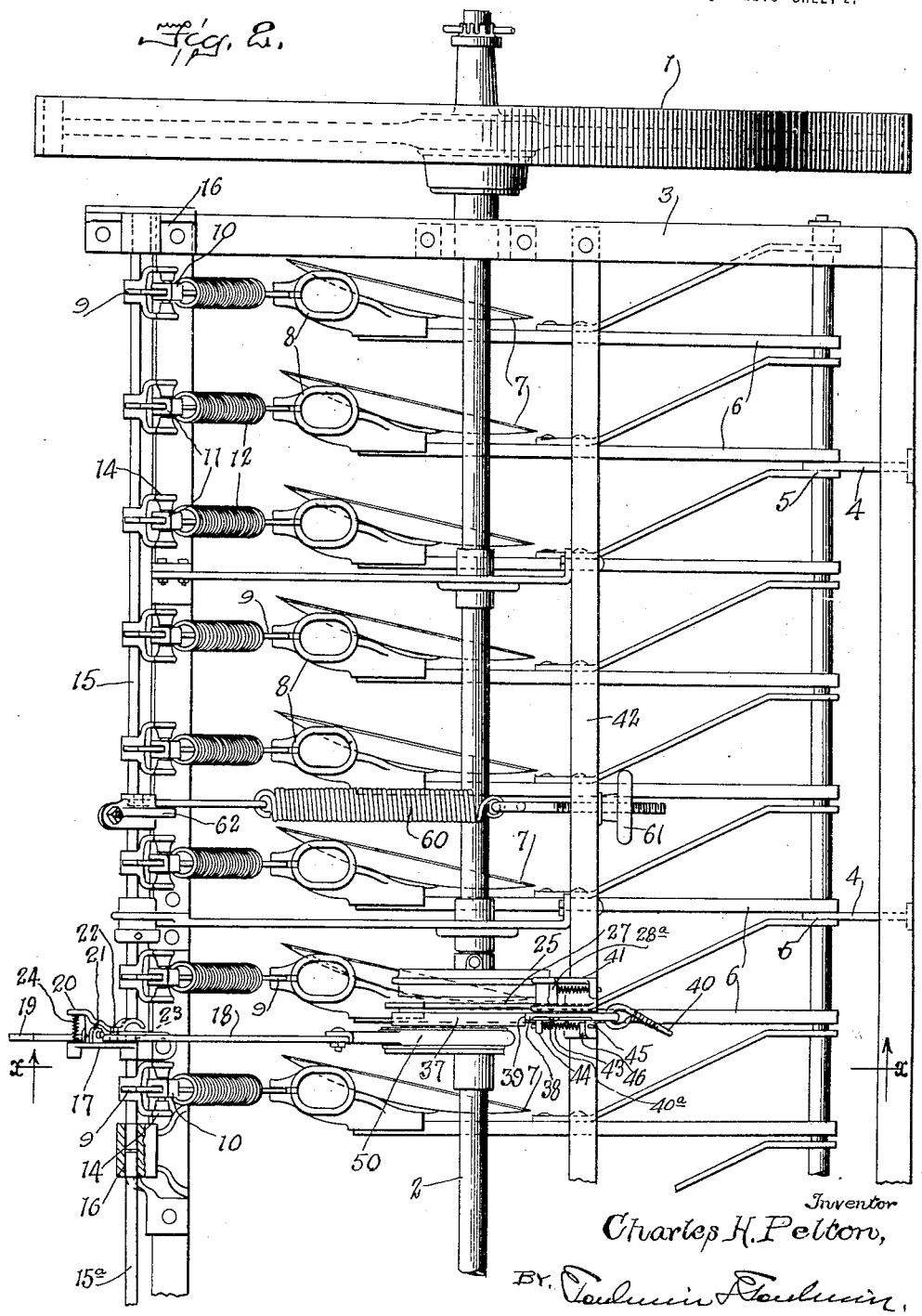

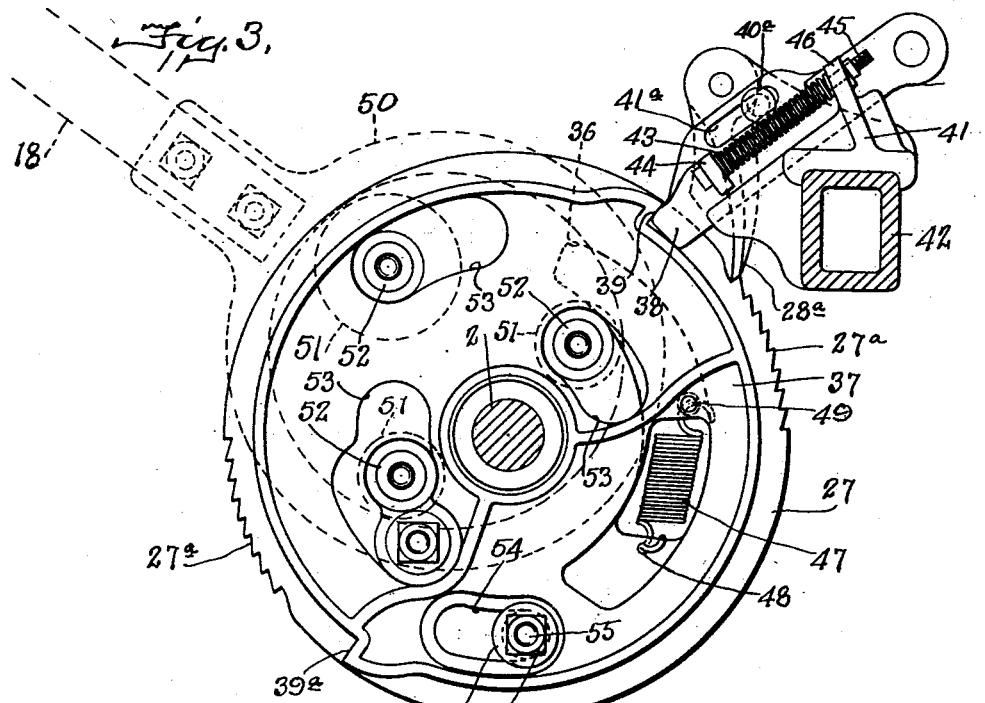
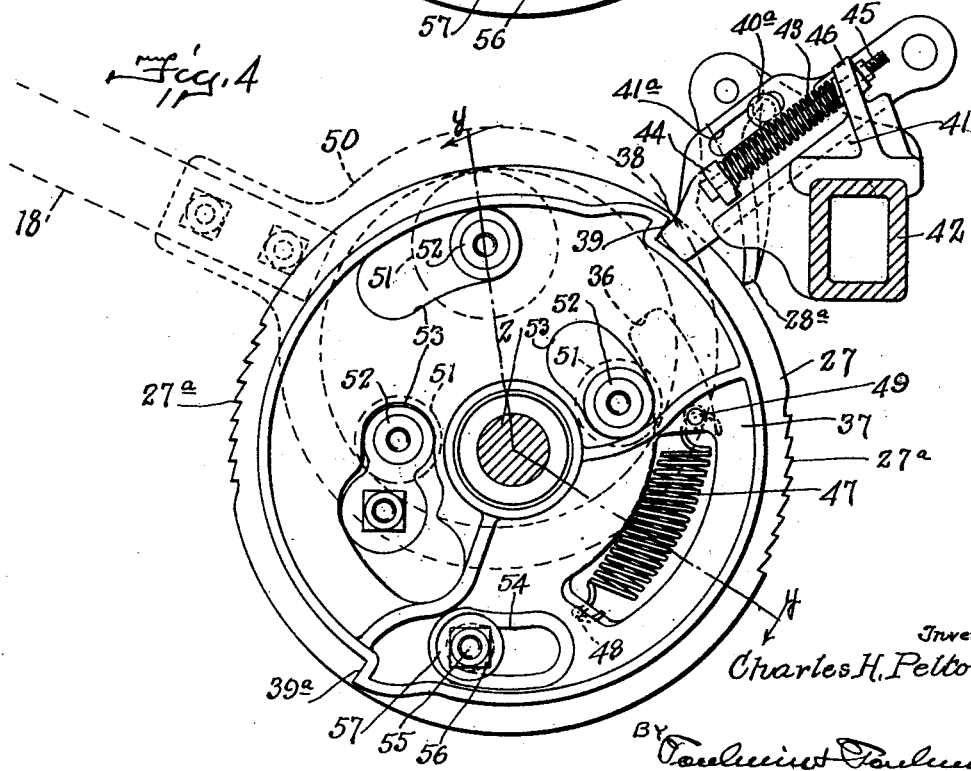

1,410,113.

Patented Mar. 21, 1922.
5 SHEETS—SHEET 4.

Inventor
Charles H. Pelton,
By
Attorneys

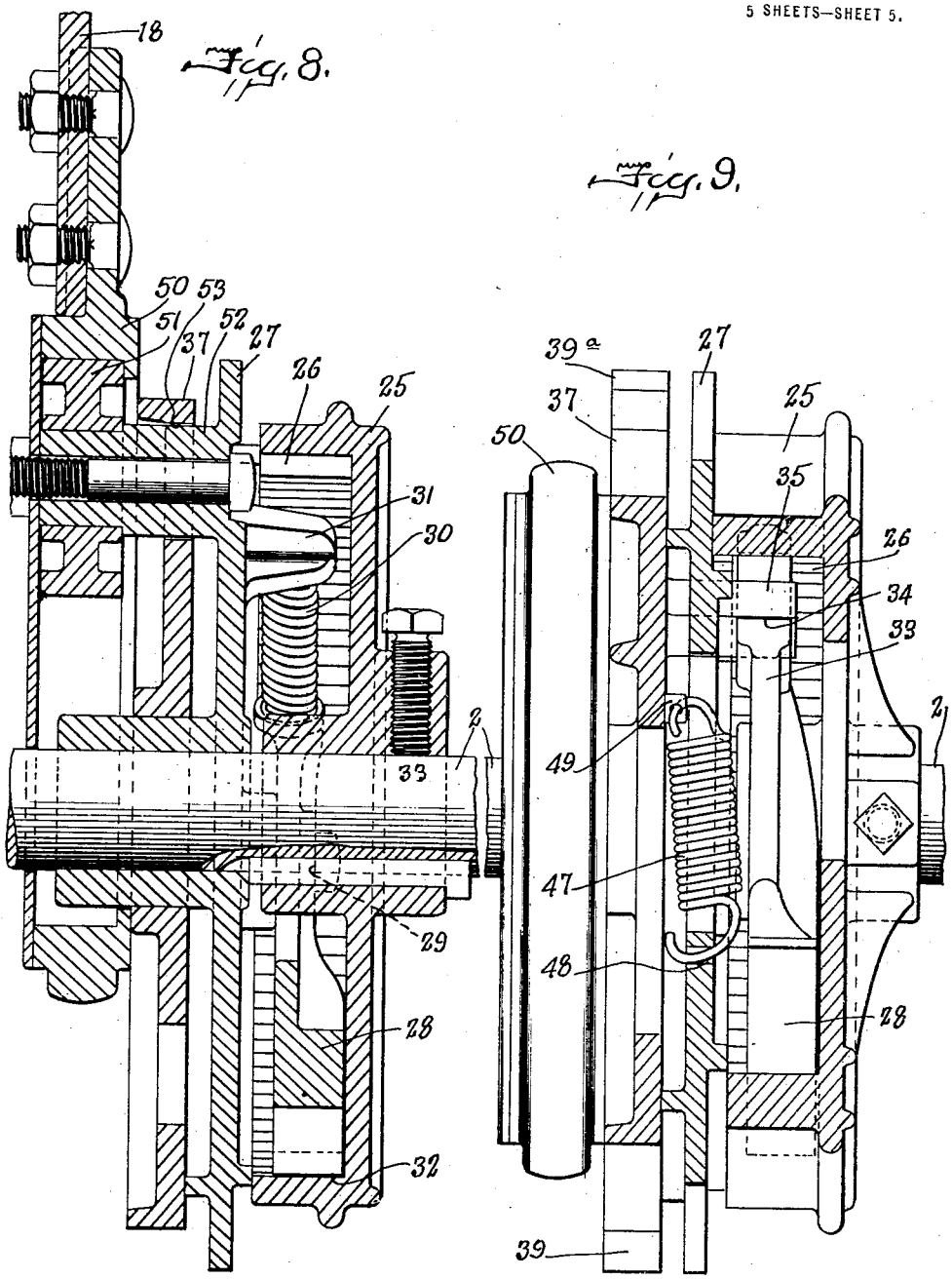

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

AGRICULTURAL IMPLEMENT.

1,410,113.

Specification of Letters Patent. Patented Mar. 21, 1922.

Application filed April 17, 1920. Serial No. 374,527.

*To all whom it may concern:*

Be it known that I, CHARLES H. PELTON, a citizen of the United States, residing at Springfield, in the county of Clark and State of Ohio, have invented certain new and useful Improvements in Agricultural Implements, of which the following is a specification, reference being had therein to the accompanying drawing.

This invention relates to agricultural implements, and more particularly to grain drills which are to be operated or drawn over the fields by a tractor or power machine.

The object in view is to provide improved means by which the forward movement of the implement or drill may be utilized in lifting from the ground the various beams which carry the disks, hose or shovels employed in acting on the soil. These beams with their equipment are usually called gangs.

A further object is to provide a spring arrangement by which the gang-lifting devices are assisted, so that the effective force employed in lifting the gangs is derived in part from the forward motion of the implement cooperating with this spring action. In some instances, however, I will employ only the forward motion to effect the lifting through my improved devices to the exclusion of the spring arrangement.

I would further state that the mechanism by which the lifting of the gangs is effected through the utilization of the forward motion of the implement comprises a rotatable member kept in motion by the forward movement of the implement, a second member having a detent adapted to engage with the rotatable member, a third member which, when unlocked, automatically throws said detent into engagement with the rotatable member so that all three members will then rotate together, and adjunct devices by which such rotary motion operates a pitman which through intermediate devices act to lift the gangs from the ground and to suspend them until occasion arises to return them to the soil.

In the accompanying drawings:—

Fig. 1 is a side elevation of a grain drill, selected for exemplification, embodying my invention;

Fig. 2 is a plan view of such a machine with my improvements embodied therein;

Fig. 3 is an enlarged detail side elevation of the lifting mechanism;

Fig. 4 is a side elevation of two members of such mechanism;

Fig. 8 is a diametrical sectional view on the line $y$ $y$ of Fig. 4, showing the relation of certain members of the lifting mechanism; and Fig. 9 is a sectional view on the line $z$ $z$ of Fig. 5 and looking in the direction of the arrow.

Figure 5:
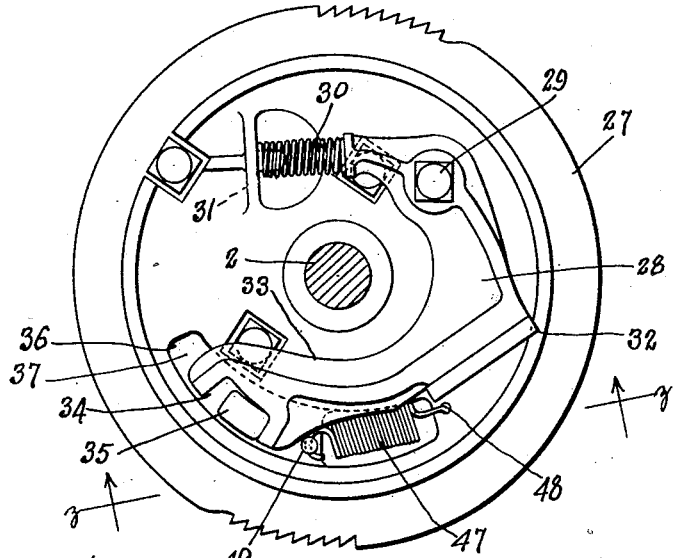
Fig. 5 is a side elevation, looking in the reverse direction, of that member of the lifting mechanism which carries the detent.
Figure 6:
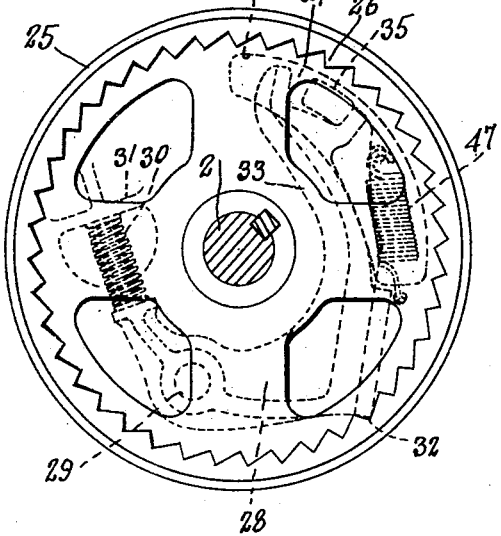
Fig. 6 is a detail side elevation of the member which constantly rotates during the forward movement of the implement and showing in dotted lines the pawl carrying member in locked position.
Figure 7:
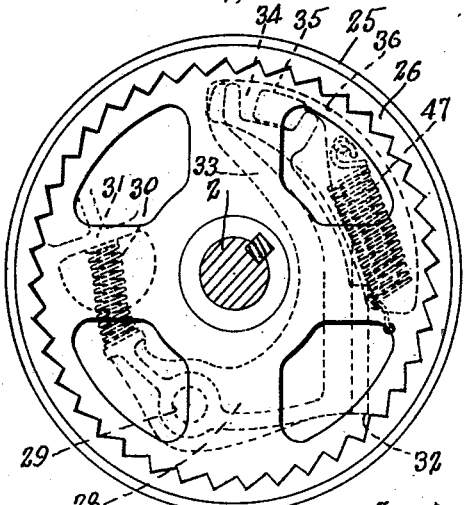
Fig. 7 is a detail side elevation of the member which constantly rotates during the forward movement of the implement and showing in dotted lines the pawl carrying member in unlocked position.

The machine generally comprises a pair of ground wheels 1 carrying an axle 2 in such fashion that when the wheels rotate the axle also revolves. A frame 3 is suitably supported on the axle. The forward end of the frame has depending arms 4 to which are pivoted at 5 beams or gangs 6, the gangs including a suitable instrument for acting on the soil, such as a disk 7 with its accompanying boot and wing 8, though, of course, shovels or any conventional device for acting on the soil, as by opening a furrow for the reception of the grain, may be employed. Each gang has connected thereto a lifting rod 9 having a sleeve 10 acting at one side against a shoulder 11 on the rod and at the other against a spring 12 supported by a pin 13. To the sleeve 10 is pivoted an arm 14 so that when the arm is actuated upward it will lift the gang from the ground and when actuated downward will permit the gang to descend into operating position. This arm 14 is secured upon a rock shaft 15 carried in suitable bearings 16 mounted on the general frame 3.

This rockshaft is connected with the lifting mechanism through suitable devices, such as a projection 17 secured to the rockshaft and adjustably connected with a pitman 18 which has a handle 19 by which it may be manipulated should occasion require. One form of connection between the projection 17 and the pitman comprises a spring catch 20 pivoted at 21 to the projection 17 and carrying a pin 22 adapted to enter any one of the several holes 23 in the pitman. A spring 24 acts to keep the pin 22 in either of the holes 23 into which it may have been inserted.

Referring now to the lifting mechanism proper, 25 designates a ratchet wheel keyed to the shaft 2 and thereby caused to constantly rotate with the wheels when the machine is moving forward. This constitutes the rotatable member of the lifting mechanism. Ratchet teeth 26 are on the interior of this member so that they can be readily engaged or interlocked with a certain pawl carried by an adjacent disk 27 comprising the pawl carrying member. This member is loosely mounted on the shaft 2 but becomes locked therewith, so as to rotate with it, when a detent 28 is actuated to engage with the ratchet teeth 26. This detent is pivoted at 29 and is kept in its inner position or out of engagement with the ratchet teeth by the action of a spring 30 supported by a lug 31 on the disk 27. The particular part of the detent 28 which engages with the ratchet teeth is shown at 32. An arm 33 of the detent is bifurcated, as shown at 34, to receive a stud 35 projecting through a slot 36 in the disk 27 and carried by the adjoining disk or member 37 of the lifting mechanism. This member is also loosely mounted on the shaft 2 but becomes locked thereto when released by the withdrawal of a locking dog 38 from engagement with a shoulder 39. This dog is actuated by the operator through the intervention of a cord or wire 40 extended to within reach of his position. A housing 41 is secured to the cross beam 42 of the general frame and carries this locking detent. The detent is held in engaging position by a spring 43 acting against a lug 44 and surrounding a pin 45 in the lug 44 and in a projection 46 of the housing. The spring acts at one end against this projection and at the other against the lug. This spring is overcome when the cord or wire 40 is pulled. The locking dog is held to the bracket 41 by means of a screw 40ª, the locking dog having a slot 41ª to permit it to slide.

The disk or member 37 being unlocked, is instantly rotatably actuated by a forceful spring 47 attached at 48 to the disk 27 and at 49 to the disk or member 37. This spring is under tension when the disk 37 is locked. When the disk is unlocked the spring 47 quickly advances the disk 37 in its relation to the disk 27 and in doing so the lug 35 on the disk 37 acts on the detent 28, turning it on its pivot 29 so that its point 32 moves radially into engagement with the ratchet teeth 26 on the constantly rotating disk or member 25.

In this way the two disks or members 27 and 37 are made to take up a rotary movement which continues through half a revolution, at which time the other shoulder 39ª on the disk 37 comes in contact with the locking detent 38, the effect of which is to arrest the further movement of the disk 37 which causes the lug 35 thereon to throw the detent 28 out of engagement with the ratchet teeth 26. This in turn causes the disk or member 27 to also stop. By this time one set of the teeth 27ª on the disk 27, of which there are two series, at diametrical points, will have passed from the pawl 28ª and the other set will have come into engagement with this pawl. Its office is to keep the disk 27 from any tendency to shifting of its position when properly actuated, as above described.

It is during the rotative movement of these disks or members that the pitman 18 is actuated to lift the gangs. This actuation is effected by an eccentric or cranklike movement of a ring 50 to which the pitman is connected and which rides upon rollers 51 on studs 52 carried by the disk 27 and placed in such a position with reference to the center of the shaft 2 that when rotated about such center these studs and their rollers impart an eccentric movement to the ring 51 and hence reciprocate the pitman 18. This movement of the pitman rocks the shaft 15 through the arm 17 and thence through the arms 14 lifts the rods 9 and elevates the gangs.

In order that the required movement, above referred to, of the disk 37 with respect to the disk 27 may be permitted, the disk 37 has slots 53 through which extend the studs 52. A further slot 54 in the disk 37 permits a bolt 55 to extend through from the disk 27 which carries this bolt. A nut 56 on this bolt and a washer 57 sliding against the disk 37 act to keep the disks 37 and 27 in their proper position in an axial direction.

As an aid in lifting the gangs, when they are particularly heavy or numerous, I prefer to employ an auxiliary lifting means comprising a spring 60 connected at one end with the frame by means of a threaded rod and hand wheel 61 and at the other to an arm 62 on the rockshaft 15. When the gangs are down this spring is somewhat under tension. When the lifting mechanism goes into operation the recoil of the spring will act on the rockshaft in a direction to increase the lifting effort of the shaft. In this way this spring cooperates with and aids the lifting mechanism in the function of elevating the gangs. But my lifting mechanism is not at all dependent upon the use of this spring, the latter being merely an aid or adjunct under some circumstances.

It will now be seen that as the drill or other implement proceeds across a field and a time arrives for elevating the gangs all that is required is a quick pull by the operator on the actuating cord or wire 40 which unlocks the detent 38 from the member 37 which under the influence of the spring 47 is given a short movement in a rotary direction. This causes the lug 35 on this member 37 to throw the pawl 28 into engagement with the ratchet teeth 26, thus interlocking the two members 27 and 37 with the constantly rotating member 25 which is keyed to the wheel shaft. Then it is that the several members rotate together with the result that the pitman is actuated by its connected ring and the several eccentrically operating studs and rollers. This movement of the pitman in turn lifts the gangs through the intermediate devices before described.

This mechanism has been thoroughly tested out in regular manufacture and commercial use and been found to be effective and sure in operation. It successfully utilizes the forward motion of the implement in effecting the automatic elevation of the disks without intervention of manual labor and exertion. The power of the tractor used in drawing the implement forward is thus put to the further useful purpose of raising the gangs.

It is to be understood that when the member 37 comes to a full stop by the contact of the stop projection 39 with the locking dog 38, after a half revolution, the momentum will carry the member 27 some distance until the then increasing tension of the spring 47 checks the member 27. When so checked the pawl 28ᵃ will snap into one of the teeth 27ᵃ and thus hold the member 27 from turning back under the pull of the spring 47. Thus the members are held in proper position for a repetition of the operation already described, so that the member 37 will make its initial movement, due to the action of the spring 47 as soon as the locking dog 38 is again withdrawn from the stop 39. It will also be understood that this continued momentum movement of the member 27 had the effect of throwing the detent 28 out of engagement with the ratchet in the member 25.

The operations by which the gangs are dropped down or lowered are as follows.

Assume that the gangs are up. First, pull the trip cord 40. This will release the member 37 and through the means already described will cause a rotation of the rollers 51 to move in a reverse direction to that in which it moved in lifting the gangs, that is, to move clockwise, which will cause the arm 14 and the rod 9 to lower the gangs where they will remain until the trip cord 40 is pulled again to cause a rotation of the parts to lift the gangs.

It will further be understood that I have confined my illustration and description to one set of gangs and one lifting mechanism. In practice the machine contains two sets of gangs and two lifting mechanisms, the main shaft 2 being continuous throughout the width of the machine and carrying the two lifting mechanisms, while the rockshaft 15 is made in two sections, one section for each set of gangs. One section of the rockshaft is operated by one lifting mechanism and the other section of the rockshaft is operated by the other lifting mechanism. The division in the rockshaft is shown in Fig. 2, 15 being one section and 15ᵃ the other section.

Having thus fully described my invention, what I claim as new and desire to secure by Letters Patent, is:—

1. A power-transmitting mechanism comprising a shaft, a clutch mounted on said shaft and having a driven mechanism including two members, one of said members being provided with arc-shaped slots, studs on the other member projecting through said slots and provided with rollers, a ring mounted on said rollers and having its axis arranged eccentrically relatively to the axis of the shaft, and a member actuated by said ring.

2. A power-transmitting mechanism comprising a shaft, a clutch mounted on said shaft, a plurality of rollers carried by said clutch, a ring mounted on said rollers and having its axis arranged eccentrically relatively to the axis of the shaft, and a member actuated by said ring.

3. A power-transmitting mechanism comprising a clutch including a driving and a driven member, a shaft on which said members are mounted, a plurality of rollers carried by the driven member of said clutch, a ring mounted upon said rollers and having its axis arranged eccentrically relatively of said shaft, and a member actuated by said ring.

In testimony whereof, I affix my signature.

CHARLES H. PELTON.